Dec. 23, 1969  A. E. ECKERMANN  3,486,030
EARTH ALBEDO SENSOR AND SUN SENSOR
Filed Aug. 16, 1966  8 Sheets-Sheet 1

INVENTOR.
ALFRED E. ECKERMANN
BY
ATTORNEY

Dec. 23, 1969  A. E. ECKERMANN  3,486,030
EARTH ALBEDO SENSOR AND SUN SENSOR
Filed Aug. 16, 1966  8 Sheets-Sheet 3

FIG. 5

INVENTOR.
ALFRED E. ECKERMANN
BY *Herbert L. Davis*
ATTORNEY

Dec. 23, 1969  A. E. ECKERMANN  3,486,030
EARTH ALBEDO SENSOR AND SUN SENSOR
Filed Aug. 16, 1966  8 Sheets-Sheet 4

INVENTOR.
ALFRED E. ECKERMANN
BY
ATTORNEY

FIG. 7

INVENTOR.
ALFRED E. ECKERMANN
BY
ATTORNEY

INVENTOR.
ALFRED E. ECKERMANN
BY Herbert L. Davis
ATTORNEY

United States Patent Office 3,486,030
Patented Dec. 23, 1969

3,486,030
EARTH ALBEDO SENSOR AND SUN SENSOR
Alfred E. Eckermann, Hasbrouck Heights, N.J., assignor to The Bendix Corporation, a corporation of Delaware
Filed Aug. 16, 1966, Ser. No. 572,775
Int. Cl. H01j 39/12, 39/00
U.S. Cl. 250—209        16 Claims

ABSTRACT OF THE DISCLOSURE

A light sensing device including a plurality of photovoltaic cells, together with aperture means cooperatively arranged so as to cause the photovoltaic cells to sense the angular relationship of an optical axis of the device to that of reflected light rays transmitted thereto from the earth or the angular relation of sun rays to the device, together with an electrical sensor network in which an algebraic sum of output voltages provided by the photovoltaic cells serve to activate a trigger network, including in the sensor network an adjustable calibrating means for setting the critical angle at which there is effected an output trigger voltage, together with novel temperature compensating means for matching the sensor network with that of the trigger network so as to correct for corresponding changes in the trigger network due to changes in the ambient temperature. Such changes in the trigger network would otherwise effect a corresponding change in a predetermined critical angular relation at which the trigger network may actuate a relay for rendering effective a light shield. The light shield being thereby rendered effective to protect a tracking telescope upon the angular relation between the incoming light rays and the optical axis of the device being less than a predetermined critical angular relation.

---

This invention relates to an earth albedo sensor and to a sun sensor and, more particularly, to a light sensing device having a relatively large field of view and adapted for use on earth oribiting satellites and space vehicles to sense the reflected sunlight from the earth so as to provide navigational functional information from this source of reflected sunlight, as well as sense light rays from the sun.

An object of this invention is to provide an optical sensor for use in conjunction with a satellite orienting earth tracking telescope which may be carried by the space vehicle at an altitude above the earth's surface of approximately 100 to 20,000 miles.

Another object of the invention is to provide a light sensing device, including a lens, first and second apertured photovoltaic cells, and a non-apertured photovoltaic cell in a spaced relationship among a common central axis within a tubular housing.

Another object of the invention is to provide such a light sensing device so arranged on an earth orbiting satellite that as the satellite turns toward the earth decreasing the angle between the optical axis of the device and a tangential line to the earth, the reflected light from the earth becomes incident on a first photovoltaic cell resulting in an electrical output therefrom of one polarity and in which device as the angle decreases, light passes through an aperture in the first photovoltaic cell and strikes a second photovoltaic cell so as to provide an electrical output from the second photovoltaic cell having a polarity opposite to that of the electrical output from the first photovoltaic cell, and in which light sensing device a continued turning movement of the satellite towards the earth cause reflected light from the earth to pass through apertures of the first and second photovoltaic cells so as to strike a third photovoltaic cell effecting an additional electrical output acting in additive relation to the electrical output of the second photovoltaic cell so as to rapidly increase the electrical output of the latter polarity for effecting a switching operation.

Another object of the invention is to provide a novel angle light sensing device utilizing a plurality of apertured photovoltaic cells for effecting a control function.

Another object of the invention is to provide a novel angle light sensing device utilizing in addition to a positive objective lens a negative lens positioned intermediate the objective lens and the apertured photovoltaic cells to effect a diffusion of the sensed light rays for increasing the effect thereof on the light sensing photovoltaic cells.

Another object of the invention is to provide a novel light sensing device in which there is utilized as the light sensing elements thereof silicon photovoltaic cells which operate extremely well in the ambient temperatures of zero plus or minus 50 degrees which prevail in a space vehicle traveling in an earth or near earth orbit.

Another object of the invention is to provide a light sensing device operative on a space vehicle to orbit the earth at an altitude of at least 500 miles and acting in conjunction with a star tracking telescope carried by the space vehicle to specificially control a triggering circuit for a relay to close a light shutter on the telescope, and thereby prevent damage to the sensitive light collecting elements of the telescope when the field of view of the telescope should happen to include the sun or a predetermined angle of reflected light rays from the earth.

Another object of the invention is to provide a light sensing device having an optical axis aligned on the space vehicle with the optical axis of the star tracking telescope so as to be capable of detecting the earth's albedo, and deliver a control signal when the optical axis of the light sensing device and corresponding optical axis of the star tracking telescope is pointing within a predetermined angle of, for example 15 degrees of a line extending tangent to the horizon of the earth.

Another object of the invention is to provide a light sensing device having a trigger control circuit including a plurality of photovoltaic cells and a variable calibrating resistor which may be adjusted to set the effective angle between the optical axis of the light sensor device and the line tangent to the horizon of the earth at which the control circuit of the light sensitive device may provide an output voltage to cause a trigger circuit to actuate a light shield or shutter for the star tracking telescope so as to prevent damage to the light sensitive elements of the telescope.

Another object of the invention is to provide a light sensing device having a trigger control circuit including a temperature responsive element to vary the calibrating resistor and thereby the value of the output trigger voltage at a preset effective angle of the light sensing device with changes in the ambient temperature so as to correct for changes in the operative characteristics of the trigger circuit due to such changes in ambient temperature and which act in a sense to vary the effective value of the trigger voltage required to cause the trigger circuit to actuate the light shield or shutter of the star tracking telescope.

Another object of the invention is to provide a novel light sensing device having a primary triggering output voltage characteristic providing a discrete step like function.

Another object of the invention is to provide a novel light sensing device of such a compact arrangement as to be capable of a very small size construction having as wide a field of view as reasonably possible.

Another object of the invention is to provide a light sensing device that has an output characteristic which is rotationally symmetric since the space vehicle carrying the device may be in any rotational position.

These and other objects and features of the invention are pointed out in the following description in terms of the embodiments thereof to which are shown in the accompanying drawings. It is to be understood, however, that the drawings are for the purpose of illustration only and are not a definition of the limits reference being had to the appended claims for this purpose.

In the drawings, wherein like reference characters refer to like parts throughout the respective views.

The sensor of the present invention is intended for applications requiring an on/off signal when the sun or illumiated earth falls within its field of view. Applications include sun impingement protection on star trackers where damage to sensitive photocathodes are possible should the sun fall within the field of view of primary optics. In such applications the sensor provides a triggering voltage which may be used to cause a relay mechanism to actuate a light excluding shutter or shield interposed in the primary optical path. The value of this critical triggering voltage may be an arbitrary predetermined value so selected as to fall within the sensor maximum to minimum output and has been shown graphically by FIGURES 9 and 10.

The operative arrangement of the sensor of FIGURES 1–4 is such that a rapid transition from positive (or negative) voltage occurs when the trigger value is reached. The sensor has two discrete operating points, permitting primary optics to track at angles closer to the diffuse illumination of the earth than to the parallel light rays from the sun. These characteristics are shown on the accompanying graph of FIGURE 9.

Figure 4:
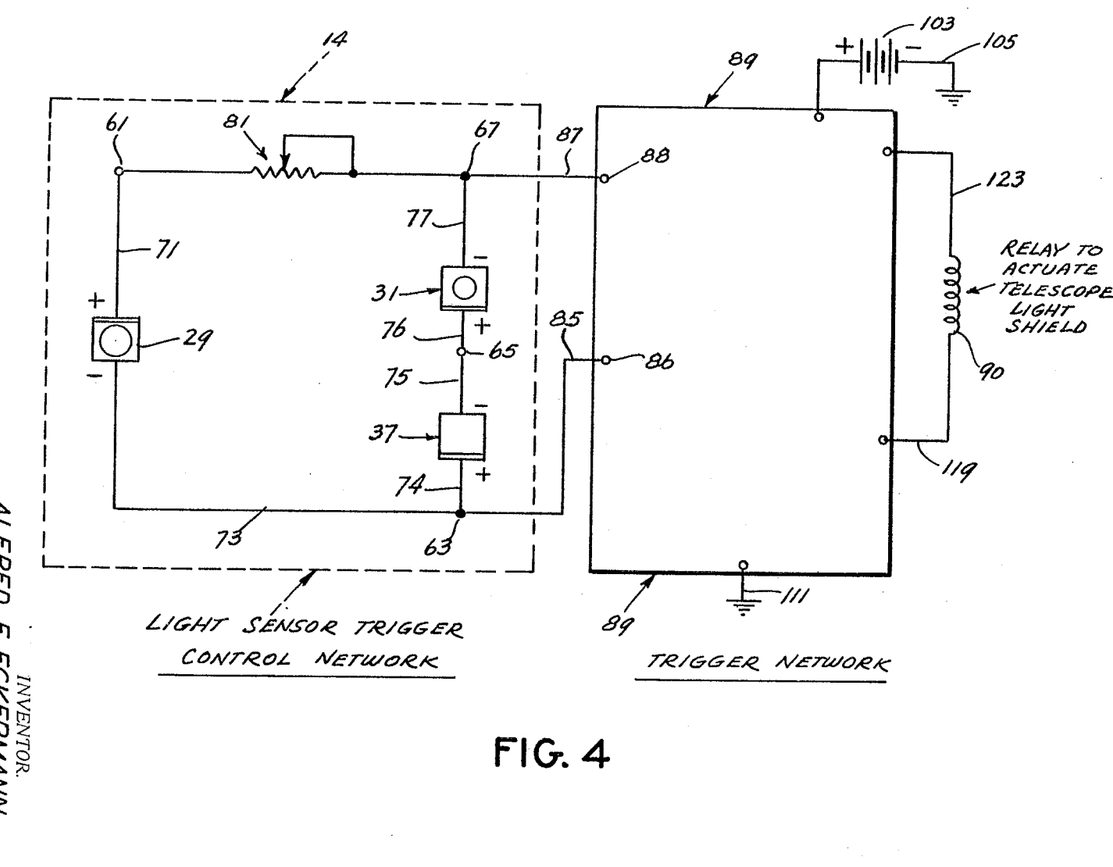
FIGURE 4 is a schematic wiring diagram of an electrical network controlled by the photovoltaic cells of FIGURES 1 and 2 including a light sensor trigger control and a trigger network operated thereby.
Figure 5:
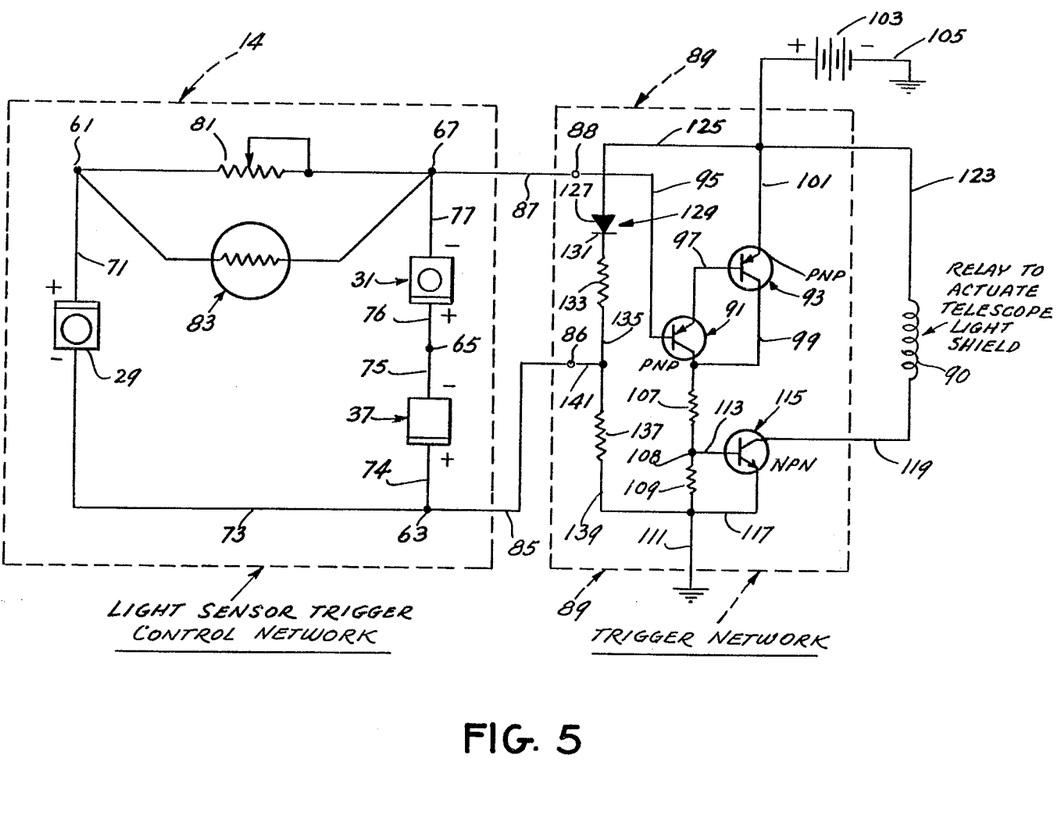
FIGURE 5 is a schematic wiring diagram of a modified form of the electrical network of FIGURE 4 showing an ambient temperature responsive means for correcting for changes in the value of the effective trigger voltage of the trigger network caused by changes in the ambient temperature so as to provide a matched pair of sensor and trigger networks having a switching point relatively independent of the prevailing ambient temperature condition.

The sensor may be used with a trigger network of a conventional type, as shown by FIGURE 4, and arranged to operate a suitable shutter solenoid. This trigger network may be packaged in a companion housing to the sensor network and, as shown in FIGURE 5, may include a matched pair of sensor and trigger networks to provide an output switching voltage relatively independent of changes in the prevailing ambient temperature.

Figure 1:
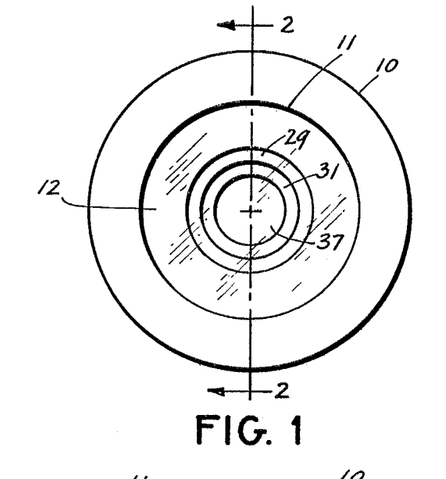
FIGURE 1 is an end view of a light sensing device embodying the present invention showing the objective lens, an apertured front plate, as well as apertured photovoltaic first and second cells and a third photovoltaic cell.
Figure 2:
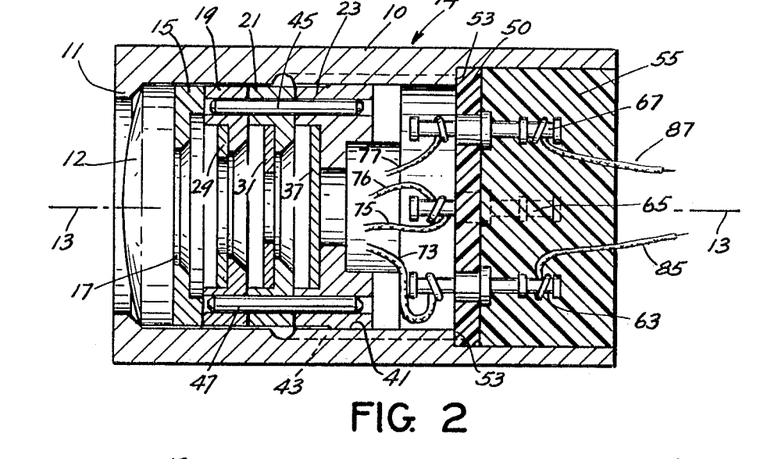
FIGURE 2 is a sectional view of the light sensing device of FIGURE 1 taken along the lines 2—2 and looking in the direction of the arrows.

Referring to the drawings of FIGURES 1 and 2, there is indicated by the numeral 10, a tubular housing in which there is mounted the several parts of a light sensor 14 embodying the present invention. The housing 10, has an internal annular flange 11 at an open end thereof adjacent to which there is a circular convex objective lens 12, of a specifically pure fused quartz to prevent discoloration in use. The objective circular lens 12 has an optical axis 13 and is securely mounted in the open end of the tubular housing 10 at the flange 11 by a suitable cement material. Positioned immediately behind the lens 12, and cemented thereto in position, is an annular plate 15, having formed therein a circular aperture 17 concentrically positioned in the annular plate 15, in relation to the optical axis 13 of the objective lens 12. The circular aperture 17 in the plate 15 is so arranged as to effect in some degree the trigger angle of the light sensing device, as hereinafter explained in greater detail.

The circular objective lens 12 and the annular apertured plate 15 are slipped into position through an opposite open end of the tubular member 10 and suitably cemented in position adjacent the internal flange 11, as shown in FIGURE 2. Further, successively positioned adjacent to the annular apertured plate 15 are annular cell holders 19 and 21, and a circular cell holder 23. The annular cell holders 19 and 21 have circular apertures 25 and 27 concentrically positioned in relation to the optical axis 13 of the lens 12 and are arranged to carry respectively silicon photovoltaic cells 29 and 31. The photovoltaic cell 29 has a circular aperture 33 slightly smaller than the circular aperture 17 in the plate 15, as well as slightly smaller than the circular aperture 25 in the cell holder 19.

The photovoltaic cell 31 has a circular aperture 35 which is somewhat smaller than the circular aperture 33 of the photovoltaic cell 29. The circular apertures 33 and 35 of the respective cells 29 and 31 are concentrically arranged in relation to the optical axis 13 of the lens 12.

Figure 3:
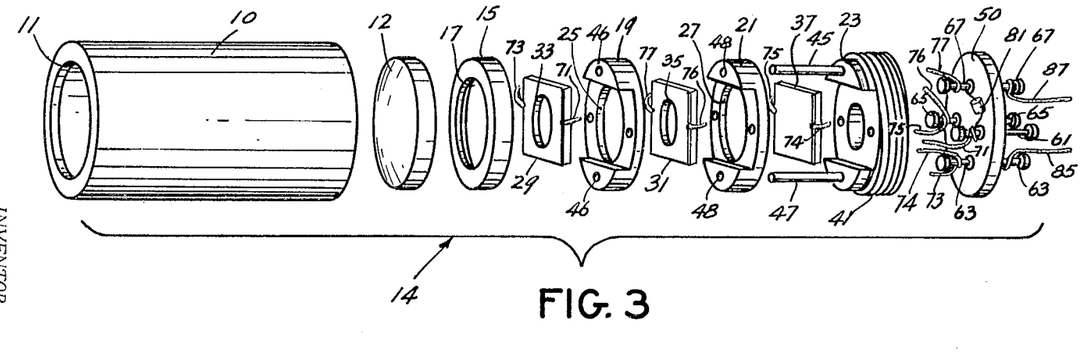
FIGURE 3 is an exploded perspective view of the light sensing device of FIGURES 1 and 2 of reduced size.

The cell holder 23 carries a non-apertured silicon photovoltaic cell 37, and further has provided in a circumferential edge thereof suitable screw threads 41, as shown in FIGURES 2 and 3, adapted to screw threadedly engage in internal screw threads provided at 43 within the tubular member 10.

Projecting axially from the circular cell holder 23 are pins 45 and 47, probably best shown in the exploded view of FIGURE 3, on which are slidably mounted the cell holders 19 and 21, as shown in FIGURE 2. The cell holders 19 and 21 having suitable openings 46 and 48, respectively, for receiving the pins 45 and 47.

The cell holders 19 and 21 are thus assembled on the pins 45 and 47 of the cell holder 23 which in turn has the threads 41 thereon screw threadedly engaged in the internal screw threads 43 of the tubular member 10 and the assembly tightened into position, as shown by FIGURE 2.

There is then positioned in the tubular member 10, a circular disc or terminal plate 50, formed of suitable electrical insulating material and positioned immediately adjacent an annular internal flange 53 provided within the tubular member 10. Suitable epoxy material 55 is then placed in the tubular member 10 to hold the terminal disc 50 in position, as shown in FIGURE 2.

As best shown in FIGURES 3 and 4, the terminal disc 50 has mounted thereon electrical terminals 61, 63, 65 and 67. The electrical terminal 61 is connected through an electrical conductor 71 to the positive terminal of the photovoltaic cell 29 while the negative terminal of the cell 29 is connected by an electrical conductor 73 to the electrical terminal 63. The electrical terminal 63 is also connected by an electrical connector 74 to the positive terminal of the photovoltaic cell 37 which has its negative terminal connected by an electrical conductor 75 to the electrical terminal 65. The electrical terminal 65 is also connected through an electrical conductor 76 to the positive terminal of the photovoltaic cell 31 which has its negative terminal connected through an electrical conductor 77 to the electrical terminal 67.

It will be further seen from the wiring diagram of FIGURE 4, that there is connected between electrical terminals 61 and 67, a variable calibrating resistor 81, having a negligible temperature coefficient or one that is slightly positive. The resistor 81 may be adjusted or so selected as to set the effective trigger value region of the device with respect to the angle $\theta$ or the angular degree of the optical axis of the light sensing device off a line extending tangent to the horizon of the earth, as has been shown by the graphical illustration of FIGURE 10, and from which it may be seen that the effective trigger value region with respect to the angular degrees off tangent of the optical axis 13 of the light sensitive device 14 increases in direct relation to the resistance of the calibrating resistor 81. Thus there may be set by the resistor 81, the value of the trigger voltage to be applied across output conductor 85 and 87, which lead, respectively, from the terminals 63 and 67, to input terminals 86 and 88 of a trigger network 89, as shown by FIGURE 4.

The trigger network 89 may be of a conventional type and is effective upon the input terminal 88 exceeding a predetermined negative value relative to the input terminal 86 to trigger the electrical energization of a relay winding 90 to actuate a light shield or shutter operating mechanism for closing a star tracker telescope carried by the space vehicle in orbit about the earth.

From the electrical network shown in FIGURE 4, it will be seen that upon the photovoltaic cell 29 being the only cell illuminated, the output signal will be positive at the terminal 67 with respect to the electrical terminal 63, which will be negative. However, as the photovoltaic cells 31 and 37 become illuminated, their combined output voltage is sufficient at resistor 81 to nullify the effect of the photovoltaic cell 29 on the output terminals 67 and 63 and, in addition, to cause the output signal at terminal 67 to become negative with respect to the output voltage at the electrical terminal 63 which now becomes positive. The role of the resistor 81 is to shape the curve and maximize the steepness of the slope at the trigger angle, as illustrated graphically in FIGURE 10. Moreover, the trigger network 89 is so arranged that only upon the output terminal 67 becoming sufficiently negative with respect to terminal 63 as to reach the trigger value, shown graphically in FIGURE 10, at the predetermined angular degree of the optical axis 13 of the light sensing device 14 off the tangent is the electromagnetic winding 90 thereupon effectively energized to cause actuation of the light shield or shutter of the telescope to the closed position to prevent damage to the telescope by excessive light rays.

Consider now the light sensor device of FIGURES 1 to 4, mounted on a space vehicle, and the space vehicle in orbit about the earth. Then consider FIGURE 11 which shows the sun, the earth, and the light sensitive device 14 in relation to each other. Their relative sizes and separations have been distorted in order to help clarify the functional operation of the device.

Figure 11:
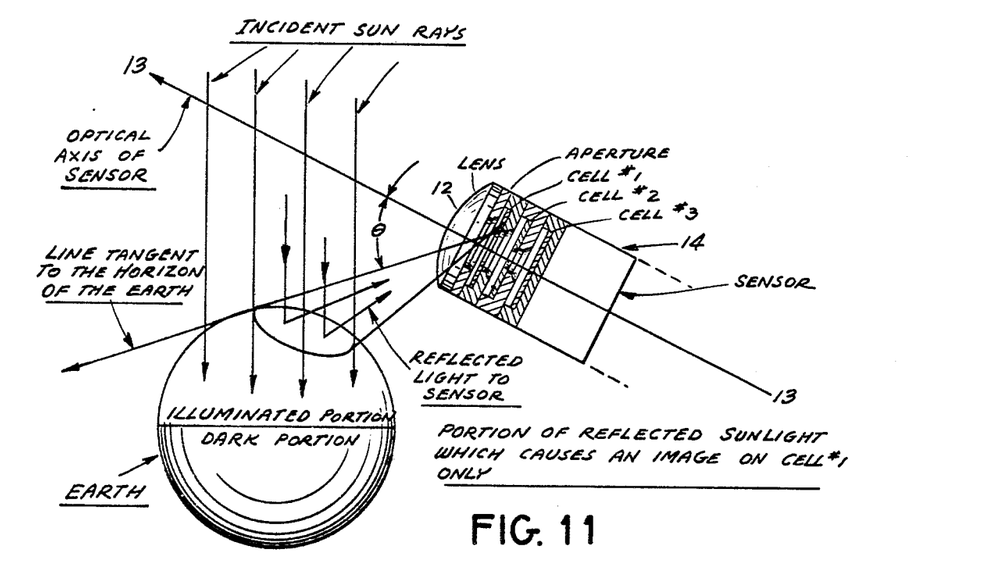
FIGURE 11 is a schematic view which has been distorted to show the image in the sensor device of FIGURES 1 and 2 upon the device being at a position where angle θ is relatively large, i.e., when the optical axis is between twenty and eighty degrees off a line tangent to the horizon of the earth.
Figure 12:
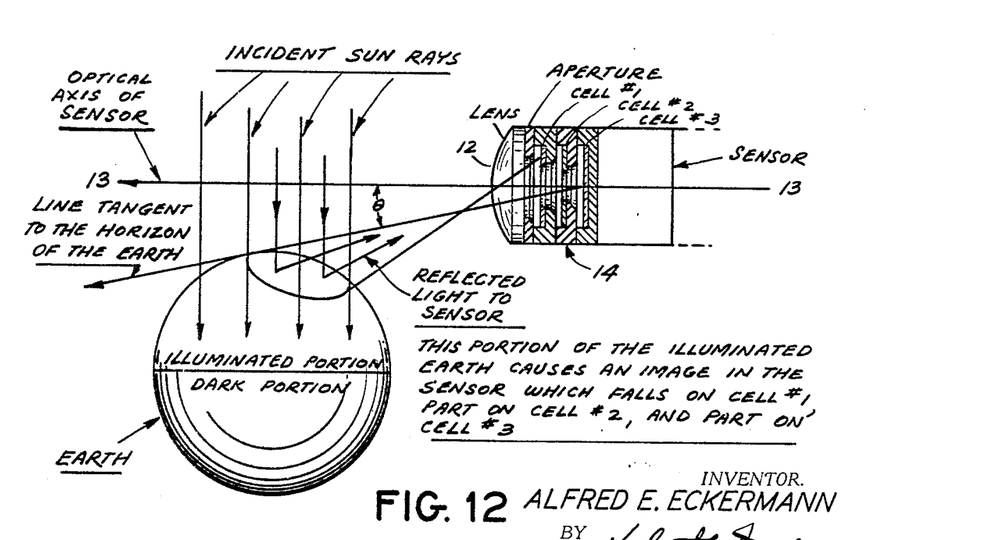
FIGURE 12 is a schematic view which has been distorted to show the image in the sensor device of FIGURES 1 and 2 upon the device being at a position where angle θ is relatively small, i.e., when the optical axis of the light sensor device is about 15 degrees off a line tangent to the horizon of the earth.

Reflected sunlight from the earth enters the objective lens 12 and strike the light sensitive elements which are designated Cell #1, Cell #2 and Cell #3 in FIGURE 11 and which correspond to the photovoltaic cells 29, 31 and 37 of FIGURES 1, 2 and 3.

When the device is in operation as in FIGURE 11, we may assume a prior starting position. Thus, in order to start the operational description, assume that the device is facing or pointing to a section of the empty sky or empty space so that neither direct sunlight nor the reflected sunlight from the earth can enter the field of view of the lens 12. Then assume that the satellite on which the sensor is mounted slowly turns in space so that the optical axis 13 of the sensor 14 moves towards the earth and reflected sunlight from the earth begins to enter the lens 12. (See FIGURE 11.) FIGURE 11 shows the optical axis 13 of the sensor 14 still sufficiently far from a line tangent to the horizon of the earth so that reflected sunlight from the earth, entering the lens 12, can only strike Cell #1, corresponding to photovoltaic cell #29, as shown in FIGURE 4. Cell #1 causes the sensor terminal 67 to yield a positive electrical output for positions in space where the optical axis 13 of the sensor 14 lie for example between 20 and 60 degrees off the line extending tangent to the horizon of the earth. The Cell #1 output upon the light sensor device 14 being in the position shown by FIGURE 11, provides a positive output at the terminal 67.

Now as the optical axis of the light sensor device 14 moves closer to the line extending tangent to the horizon of the earth upon the space satellite turning, some of the reflected earth image light will be intercepted by the Cell #2 corresponding to the photovoltaic cell 31 and this voltage output from cell 31 will now act so as to negate the output of the photovoltaic cell 29 or Cell #1 so that the positive output characteristic at the terminal 67 of FIGURE 11 thereupon begins to decrease and go negative as the angle $\theta$ between the optical axis of the light sensor device and the line tangent to the horizon of the earth decreases to zero. As the angle $\theta$ becomes smaller, for example at 15°, the image light begins to strike the photovoltaic cell 37 or Cell #3 which further enhances the output of Cell #2 (See FIGURE 4) so as to yield an even larger negative signal output at the terminal 67. The negative signal continues to increase and reaches a maximum value when the optical axis of the device is coincident with the center of the earth, and its total field of view is fully illuminated.

The light sensitive device 14 will act in a simlar manner when it approaches the sun and direct sun rays enter the lens. Since the device is built with rotational symmetry about the optical axis 13 the azimuthal position of the sun or earth does not effect the output signal from the sensor 14. At a predetermined angular relation of the optical axis 13 of the sensor device 14 with that of the line extending tangent to the horizon of the earth, of for example 15°, as shown graphically at FIGURE 9, the negative bias applied at the output termial 67 and through conductor 87 to the input conductor 88 of the trigger network is increased to a sufficient value to trigger the operation of the trigger network 89 and cause the energization of the electromagnetic winding 90 to thereupon effect the actuation of the light shield or shutter mechanism of the star tracking telescope carried by the satellite as heretofore explained.

MODIFIED FORM OF INVENTION OF FIGURE 5

It has been found that in the form of invention of FIGURE 4, the trigger network 89 may become unmatched with respect to the electrical network of the sensor 14 due to the effects of changes in the ambient temperature upon the operating characteristics of the components of the trigger network 89. Thus, the value of the voltage required to trigger the trigger network 89 may be effectively varied with a change in the prevailing ambient temperature. A typical trigger network that may be utilized is shown in FIGURE 5 and includes a pair of PNP type transistors 91 and 93, in which the transistor 91 has a base element connected by an electrical conductor 95 to the output conductor 87 leading from the electrical network of the light sensor trigger control device 14. The transistor 91 further has an emitter element connected by an electrical conductor 97 to the base element of the transistor 93. The transistor 91 further has a collector element connected by conductor 99 to the connector element of the transistor 93. The emitter of the transistor 93 is connected by an electrical conductor 101 to a positive terminal of a source of electrical energy or battery 103 having a negative terminal connected by an electrical conductor 105 to ground.

Further the conductor 99 connecting the collector elements of the transistors 91 and 93, is in turn connected by a resistor 107, conductor 108 and resistor 109 through a conductor 111 to ground. Leading from the conductor 108 intermediate resistors 107 and 109 is a conductor 113 which leads to a base element of an NPN type transistor 115 having an emitter element connected by a conductor 117 to the grounded conductor 111 and a collector element connected by a conductor 119 to one terminal of the electromagnetic winding 90 having an opposite terminal connected through a conductor 123 to the positive terminal of the source of electrical energy 103. The electromagnetic winding 90, as heretofore explained, is effective upon energization to actuate a light shield or shutter of a star tracking telescope so as to protect the light sensitive elements of the telescope from damage should the field of view of the telescope happen to include the direct light rays from the sun or reflected rays from the earth upon the optical axis 13 of the light sensitive device 14 being positioned within a predetermined critical angular range $\theta$ of a lne extending tangent to the horizon of the earth.

Furthermore, connected to the positive terminal of the source of electrical energy 103, is an electrical conductor 125 leading to an anode element 127 of a diode 129 having a cathode element 131 connected through a resistor element 133, conductor 135, resistor element 137 and conductor 139 to the grounded conductor 111. Further, an input conductor 141 leads from the input terminal 86 and thereby from the output conductor 85 of the light sensor control network of the device 14 to the conductor 135 connected intermediate the resistor elements 133 and 137.

Figure 9:
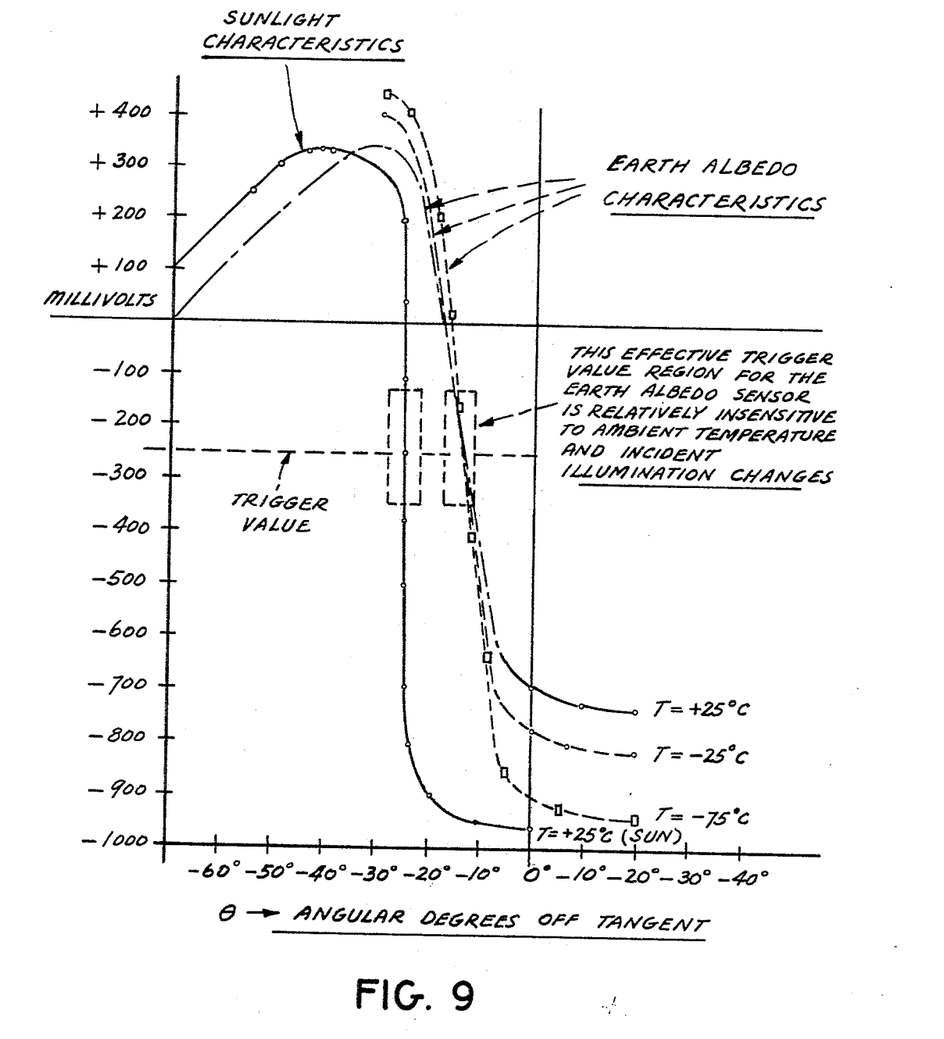
FIGURE 9 is a graphical illustration of the voltage output of the light sensing device of FIGURES 1–4 upon the optical axis thereof being positioned at the indicated angles θ to a line extending tangent to the horizon of the earth and showing that the effective trigger value region of the device is relatively insensitive to ambient temperature and incident illumination changes.

The trigger network 89 as thus described and shown in FIGURE 5, will be effective to trigger the energization of electromagnetic winding 90, upon the negative voltage applied to the base of the transistor 91, exceeding a predetermined value which, as shown graphically in FIGURE 9, will be effective upon the optical axis 13 of the sensor device being at a position corresponding to the angle $\theta$ or at a predetermined angular degree off the tangent.

However, the emitter-base junction resistance of the transistors 91, 93 and 115, as is well known in the art, will decrease when the prevailing ambient temperature is increased while the resistance of the emitter-base junction will increase when the ambient temperature is decreased. That is, the emitter-base junction resistance has a negative temperature coefficient of resistance. Thus the value of the negative trigger voltage applied to the base of the PNP type transistor 91 required to trigger the network 89 to a state for energizing the electromagnetic winding 90 is effectively increased with the increase in the emitter-base junction resistance when the ambient temperature is decreased while the value of this trigger voltage required to trigger the network 89 would be effectively decreased with the decrease in the emitter-base junction resistance upon the ambient temperature being increased.

In order to compensate for this condition and to more closely match the pair of sensor and trigger networks so that the angle off tangent at which the switching point trigger value is effective is relatively independent of the prevailing ambient temperature, there is provided in the electrical network of the sensor 14 a novel temperature compensating means to correct for this negative temperature coefficient of resistance in the trigger network 89 so that the sensor and trigger networks may be more closely matched.

In effecting the corrective temperature compensating action in the electrical network of the sensor 14 there is connected in parallel with the trigger value selecting or calibrating resistor 81 and between the electrical terminals 61 and 67 a thermister 83 of a conventional type having a negative temperature coefficient of resistance which so arranges itself as to correct for the described change in the operating characteristic of the trigger network due to variations in the ambient temperature and improve the overall temperature stability of the network of the sensor 14 in relation to the trigger 89.

In the operation of the thermister 83, it will be seen that as the prevailing ambient temperature increases causing a decrease in the effective trigger voltage required to trigger the trigger network 89, the thermister 83, having a negative temperature coefficient of resistance, is so arranged as to match the effect of the ambient temperature on the trigger network 89 by compensating for the decrease in the effective trigger voltage required to trigger the network by a decrease in the resistance of the thermister 83 with increase in the ambient temperature.

Figure 10:
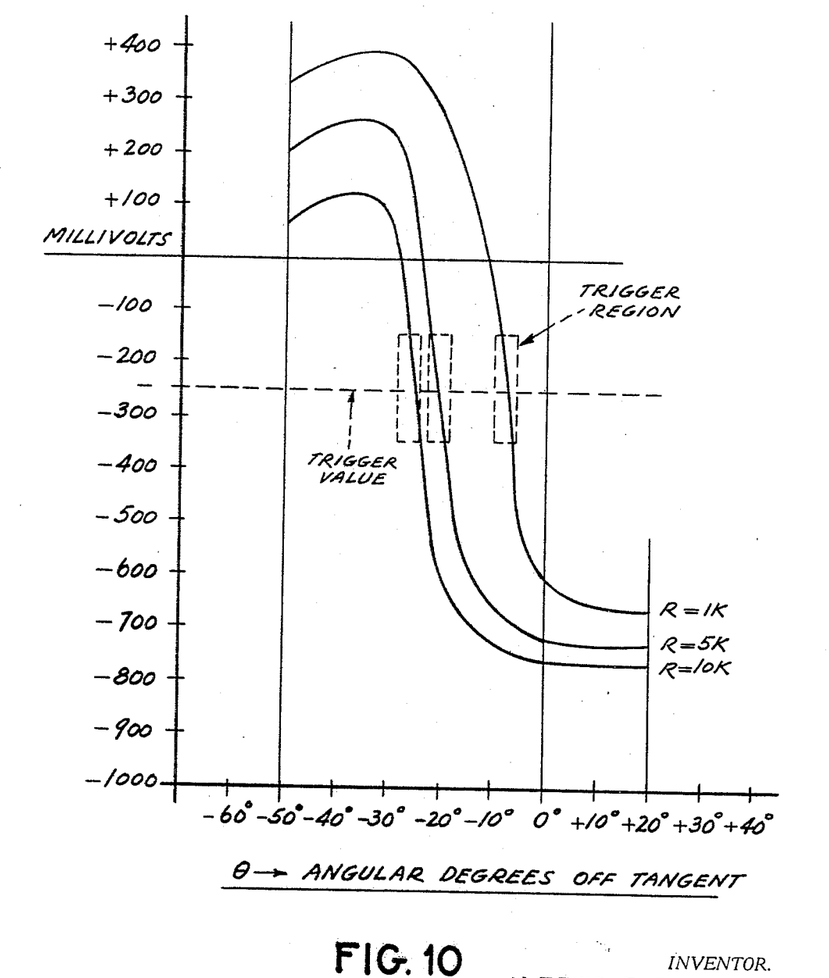
FIGURE 10 is a graphical illustration of the shifts of the voltage output of the light sensing device of FIGURES 1–4 for the different indicated values of a variable calibration resistor in the light sensor trigger control circuit of FIGURE 4 and illustrating that the effective trigger value region with respect to the angular degrees off tangent of the optical axis of the device increases in direct relation to the resistance of the calibrating resistor.

Thus the resistance of the thermister 83, having a negative temperature coefficient of resistance, will tend to decrease with the increase in the ambient temperature so as to effectively decrease the trigger voltage output of the light sensor device 14 for a given angular degree off the tangent, or angle $\theta$, as shown graphically by FIGURE 10, while this increase in the ambient temperature will also cause the value of the effective voltage required to trigger the network 89, as heretofore described with reference to FIGURE 5, to be decreased. Of course, upon a decrease in the ambient temperature, an opposite compensating effect will be provided by the thermistor 83. The change in the sensor network then tends to compensate for the change in the trigger network so that through such a matched pair of sensor and trigger networks, the angle $\theta$ or the critical angle between a line extending tangent to the horizon of the earth and the optical axis 13 of the device 14 at which the trigger network 89 and thereby the energization of the shutter control solenoid 121 is brought into operation will be relatively unchanged and independent of the change in the prevailing ambient temperature.

In the event the trigger network 89 is of a type having an opposite positive temperature coefficient of resistance, then the compensating effect may be provided by a thermistor 83 having a positive temperature coefficient of resistance to effect the required corrective action.

MODIFIED FORM OF THE LIGHT SENSING DEVICE OF FIGURES 6 AND 7

Figure 6:
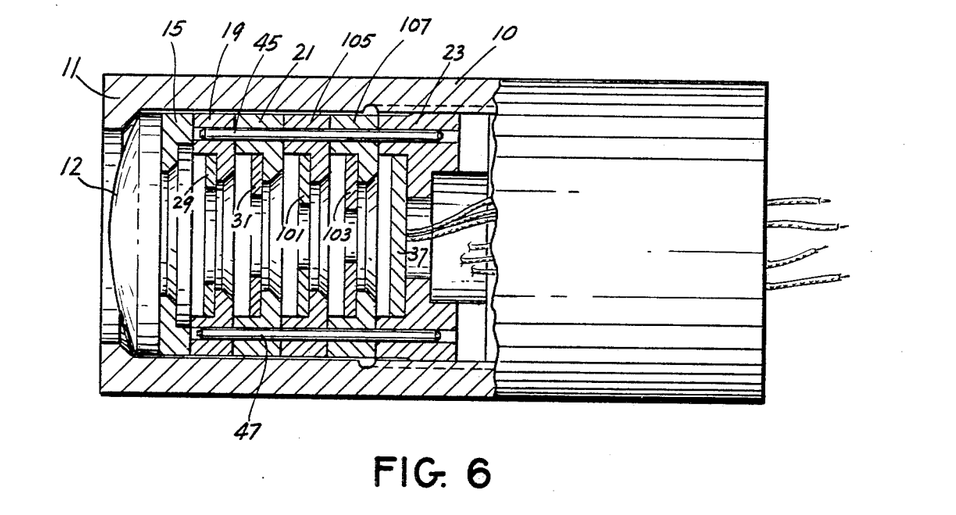
FIGURE 6 is a sectional view of a modified form of the light sensing device of FIGURE 2 and showing additional photovoltaic cells.
Figure 7:
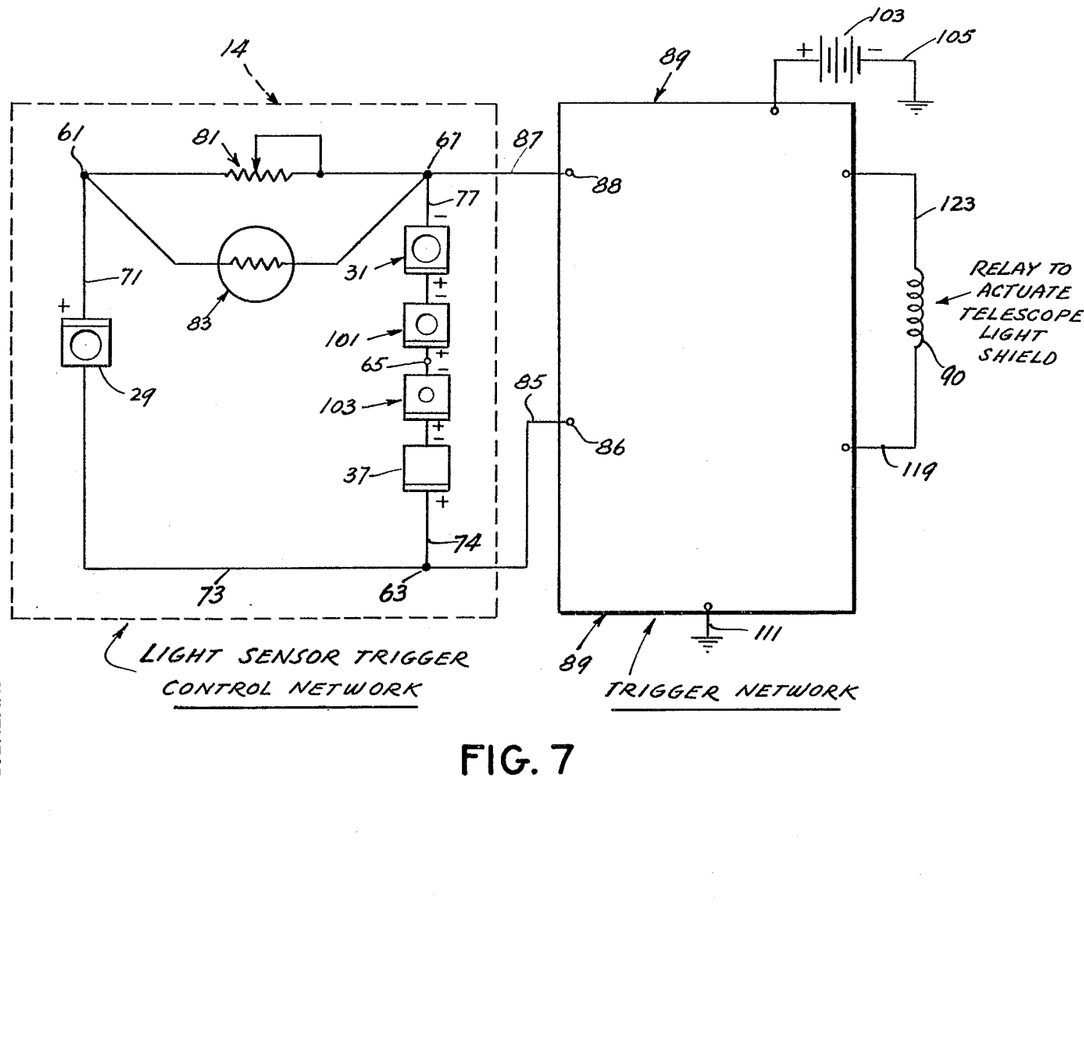
FIGURE 7 is a schematic wiring diagram of a modified form of an electrical network controlled by the multiple photovoltaic cells of FIGURE 6 and including a light sensor trigger control network.

While there has been shown by FIGURES 1 through 4, a light sensitive device 14 utilizing three photovoltaic cells, the number of these cells may be dependent upon the nature and operating characteristics of the equipment to be controlled thereby. Thus, as shown in FIGURES 6 and 7, other apertured silicon photovoltaic cells 101 and 103 may be mounted in the tubular member 10, and carried by suitable apertured cell holders 105 and 107, respectively, as shown in FIGURE 6. The structure of the light sensing device 14 being otherwise substantially the same, as heretofore described with reference to FIGURES 1–3.

In addition, the photovoltaic cells 101 and 103 of the modified form of the invention of FIGURE 6, may be operatively connected in a light sensor network as shown by the wiring diagram of FIGURE 7, in which the operation of the light sensor control network of FIGURE 7 is substantially the same as that of FIGURE 5 except that to effect the required trigger voltage, illumination of the four photovoltaic cells 31, 101, 103 and 37 may be required.

The photovoltaic cell 101 in the network of FIGURE 7 has the negative terminal thereof connected to the positive terminal of the photovoltaic cell 31 while the positive terminal of the cell 101 is connected to the electrical terminal 65. The photovoltaic cell 103 has the negative terminal thereof connected to the electrical terminal 65 while the positive terminal of the cell 103 is connected to the negative terminal of the photovoltaic cell 37. Thus the cells 31, 101, 103 and and 37 are connected in series between the output terminals 63 and 67 and apply an output voltage upon illumination acting in opposition to the voltage of the cell 29.

MODIFIED FORM OF THE LIGHT SENSING DEVICE OF FIGURE 8

Figure 8:
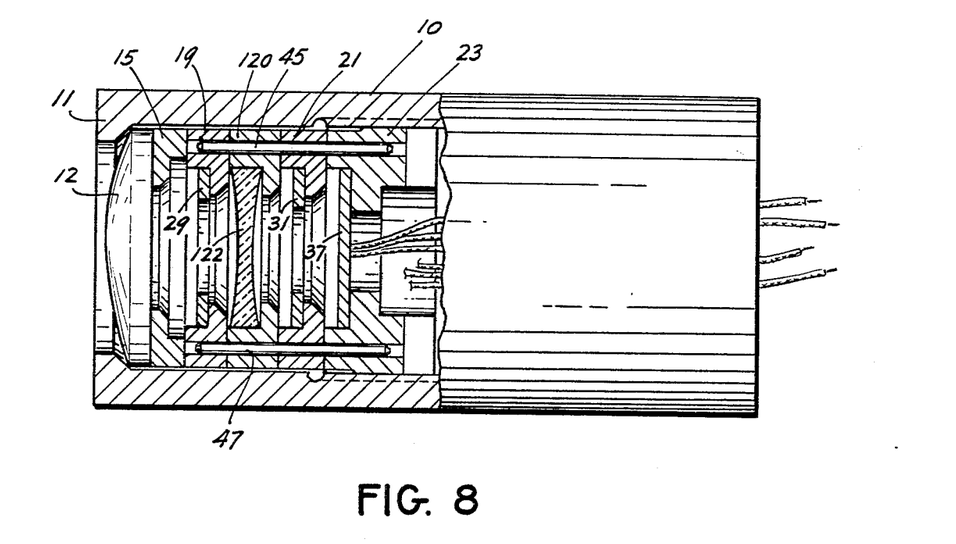
FIGURE 8 is a sectional view of another modified form of the light sensing device of FIGURE 2 and illustrating photovoltaic cells to effect a diffusion of the sensed light rays relative to the apertured photovoltaic cells.

A further modified form of the invention is illustrated in FIGURE 8 in which the structure of the light sensing device differs from that of the light sensing device of FIGURE 2, in providing a lense holder 120 and a negative or concave lens 122, carried thereby and positioned intermediate the photovoltaic cell 29 and and the photovoltaic cell 31 so as to effect a diffusion of the sensed light rays relative to the apertured photovoltaic cell 31 so as to increase the effect of the light rays on the light sensing photovoltaic cell 31. The electrical network for the light sensing device of FIGURE 8 may be substantially the same as that shown by either FIGURE 4 or FIGURE 5.

It will be seen from the foregoing that there has been provided in the present invention a light sensing device utilizing a plurality of apertured photo cells operable for sensing the angular relationship of the optical axis of the device to that of a line extending tangent from the horizon of the earth and a device responsive to the extent of reflected light rays transmitted thereto from the earth or the angular relation of the sun to the device, together with a novel electrical sensor network including an adjustable calibrating resistor 81 for setting the critical angle at which there is effected an output trigger voltage, together with novel temperature compensating means for matching the sensor network with that of the trigger network in which the value of the effective trigger voltage may vary with the prevailing ambient temperature.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An electro-optical apparatus comprising a light ray angle sensing means including an objective lens having an optical axis extending in angular relation to incoming light rays, a plurality of photovoltaic cells, means for mounting the photovoltaic cells in spaced relation along the optical axis, the photovoltaic cells extending in the mounting means transverse the optical axis, at least one of the photovoltaic cells including aperture means dependent upon the angular relation of the incoming light rays to said optical axis in passing through the objective lense for selectively illuminating other of the photovoltaic cells, at least one of the photovoltaic cells providing upon illumination thereof a first electrical output voltage, the other of the photovoltaic cells providing upon the selective illumination thereof a second electrical output voltage acting in opposition to the first electrical output voltage, and means for providing a resultant difference in said first and second voltages as an electrical output signal responsive to the angular relation of the incoming light rays to the optical axis of the objective lens.

2. An electro-optical apparatus in accordance with claim 1 including the photovoltaic cells being serially connected in an electrical network and so arranged that the first and second electrical output voltages act in opposition, and electrical output conductors for applying a resultant difference in said output voltages as an electrical output signal dependent upon said angular relation of the incoming light rays to the optical axis of the objective lens being less than a predetermined critical angular relation.

3. An electro-optical apparatus in accordance with claim 1 in which the light ray angle sensing means includes a tubular housing, the objective lens being mounted in an open end of said tubular housing, a plate having a circular aperture positioned in said housing adjacent to said objective lens, the plurality of photovoltaic cells being mounted in said tubular housing in successive order, at least one of said photovoltaic cells having a circular aperture therein, the optical axis of the objective lens extending in concentric relation to said circular apertures, the apertured cell being positioned in said tubular housing intermediate said apertured plate and other of said photovoltaic cells, the circular aperture of said cell having a smaller diameter than the circular aperture of said plate so that passage of light rays to said photovoltaic cells through said apertures may be effectively controlled by the angular relation of the optical axis of the objective lens to the incoming light rays so as to selectively illuminate the photovoltaic cells. the trigger network due to changes in the ambient temperature. Such changes in the trigger network would otherwise effect a corresponding change in a predetermined critical angular relation at which the trigger network may actuate a relay for rendering effective a light shield. The light shield being thereby rendered effective to protect a tracking telescope upon the angular relation between the incoming light rays and the optical axis of the device being less than a predetermined critical angular relation.

4. An electro-optical apparatus in accordance with claim 3 including the photovoltaic cells being serially connected in an electrical network and so arranged that the first and second electrical output voltages act in opposition, and electrical output conductors connected across said one photovoltaic cell for applying a resultant difference in said output voltages as an electrical output signal dependent upon the angular relation of the incoming light rays to the optical axis of the objective lens being less than a predetermined critical angular relation.

5. An electro-optical apparatus in accordance with claim 3 in which the photovoltaic cells include a first photovoltaic cell having a circular aperture therein, a second photovoltaic cell having a circular aperture therein, and a third photovoltaic cell, said objective lens having an optical axis extending in concentric relation to said circular apertures, the first and second apertured cells being positioned in said tubular housing intermediate said apertured plate and said third photovoltaic cell, the circular aperture of said first photovoltaic cell having a smaller diameter than the circular aperture of said plate, and the circular aperture of said second photovoltaic cell having a small diameter than the circular aperture of said first photovoltaic cell, the circular apertures having successively small diameters so that the passage of light rays to said photovoltaic cells through said apertures may be effectively controlled by the angular relation of the optical axis of the object lens to the incoming light rays so as to selectively illuminate the photovoltaic cells.

6. An electro-optical apparatus in accordance with claim 5 including a concave lens interposed between the first and second photovoltaic cells to effect a diffusion of the incoming light rays to the second and third photovoltaic cells.

7. An electro-optional apparatus in accordance with claim 5 including a calibrating resistor, the first, second and third photovoltaic cells being serially connected with the calibrating resistor in an electrical loop network, the first photovoltaic cell providing upon illumination thereof a first electrical output voltage, the second and third photovoltaic cells providing upon illuminaton thereof a second electrical output voltage, the photovoltaic cells being operatively arranged so that the first and second electrical output voltages act in opposition, a pair of electrical output conductors, one of said electrical output conductors leading from a point between said serially connected calibrating resistor and said second photovoltaic cell, and the other of said electrical conductors leading from a point between said first and third serially connected photovoltaic cells, and a resultant difference in said output voltages being applied through said output conductors as an electrical output signal responsive to said angular relation of the incoming light rays to the optical axis of the objective lens.

8. An electro-optical apparatus comprising a light ray angle sensing means including an objective lens having an optical axis extending in angular relation to incoming light rays, a plurality of photovoltaic cells, means for mounting the photovoltaic cells in spaced relation along the optical axis, the photovoltaic cells extending in the mounting means transverse the optical axis, the mounting means including a plate having a circular aperture therein dependent upon the angular relation of the incoming light rays to said optical axis in passing through the objective lens for selectively illuminating the photovoltaic cells, at least one of the photovoltaic cells providing upon the selective illumination thereof a first electrical output voltage, other of the photovoltaic cells providing upon the selective illumination thereof a second electrical output voltage acting in opposition to the first electrical output voltage, said one photovoltaic cell having a circular aperture of smaller diameter than the circular aperture in the plate of said mounting means, said one photovoltaic cell being positioned intermediate the plate and said other photovoltaic cells, the other of said photovoltaic cells including first, second, third and fourth photovoltaic cells, the first, second and third photovoltaic cells having circular apertures of smaller diameter than the circular aperture of said one photovoltaic cell, and the circular apertures of the first, second and third photovoltaic cells being successively smaller in diameter than the circular aperture of the immediately preceding photovoltaic cell, all of the circular apertures being arranged in concentric relation to the optical axis of the objective lens so that the passage of light rays to said photovoltaic cells through said apertures may be effectively controlled by the angular relation of the optical axis of the objective lens to the light rays so as to selectively illuminate the photovoltaic cells, and means for providing a resultant difference in said first and second voltages as an electrical output signal responsive to the angular relation of the incoming light rays to the optical axis of the objective lens.

9. An electro-optical apparatus in accordance with claim 8 including a calibrating resistor, the photovoltaic cells being serially connected with the calibrating resistor in an electrical loop network, the first, second, third and fourth photovoltaic cells providing upon illumination thereof the second electrical output voltage, the photovoltaic cells being operatively arranged so that the first and second electrical output voltages act in opposition to provide a resultant differential voltage, and electrical output conductors for applying the resultant difference in said first and second output voltages as an electrical output signal responsive to the angular relation of the incoming light rays to the optical axis of the objective lens.

10. For use on an earth orbiting space vehicle carrying a tracking telescope, an electro-optical apparatus comprising a light ray angle sensing means including an objective lens having an optical axis extending in an angular relation to incoming albedo light rays from the earth, a plurality of photovoltaic cells, means dependent upon the angular relation of the incoming light rays to said optical axis in passing through the objective lens for selectively illuminating the photovoltaic cells, at least one of the photovoltaic cells providing upon the selective illumination thereof a first electrical output voltage, other of the photovoltaic cells providing upon the selective illumination thereof a second electrical output voltage acting in opposition to the first electrical output voltage, and means for providing a resultant difference in said first and second voltages as an electrical output signal responsive to the angular relation of the incoming light rays to the optical axis of the objective lens, and in which electro-optical apparatus there is included a trigger network controlled by the electrical output signal to actuate a relay for rendering effective a light shield for the telescope upon the angular relation between the incoming light rays and the optical axis of the objective lens being less than a predetermined critical angular relation.

11. For use on an earth orbiting space vehicle carrying a tracking telescope, an electro-optical apparatus as defined by claim 10 including an ambient temperature responsive means to vary the electrical output signal resulting upon the angular relation of the incoming light rays to the optical axis of the objective lens being less than said predetermined critical angular relation, said ambient temperature responsive means varying said electrical output signal with changes in the prevailing ambient temperature so as to correct for corresponding changes in the trigger network caused by the changes in the ambient temperature and which would otherwise effect a corresponding change in the predetermined critical angular relation at which the relay may be actuated to render effective the light shield for the telescope.

12. For use on an earth orbiting space vehicle carrying a tracking telescope, an electro-optical apparatus comprising a light ray angle sensing means including an objective lens having an optical axis extending in an angular relation to incoming albedo light rays from the earth, a plurality of photovoltaic cells, means for mounting the photovoltaic cells in spaced relation along the optical axis, the photovoltaic cells extending in the mounting means transverse the optical axis, the mounting means and at least one of the photovoltaic cells including aperture means dependent upon the angular relation of the incoming light rays to said optical axis in passing through the objective lens for selectively illuminating the photovoltaic cells, at least one of the photovoltaic cells providing upon the selective illumination thereof a first electrical output voltage, other of the photovoltaic cells providing upon the selective illumination thereof a second electrical output voltage acting in opposition to the first electrical output voltage, the photovoltaic cells being serially connected in an electrical network and so arranged that the first and second electrical output voltages act in opposition, and electrical output conductors for applying a resultant difference in said output voltages as an electrical output signal, and including a trigger network controlled by the electrical output signal to actuate a relay for rendering effective a light shield for the telescope upon the angular relation between the incoming light rays and the optical axis of the objective lens being less than a predetermined critical angular relation.

13. For use on an earth orbiting space vehicle carrying a tracking telescope, an electro-optical apparatus comprising a light ray angle sensing means including an objective lens having an optical axis extending in an angular relation to incoming albedo light rays from the earth, a plurality of photovoltaic cells, means for mounting the photovoltaic cells in spaced relation along the optical axis, the photovoltaic cells extending in the mounting means transverse the optical axis, the objective lens being in an open end of said mounting means, a plate having a circular aperture positioned in said mounting means adjacent to said objective lens, said photovoltaic cells being mounted in said mounting means in successive order and including a first photovoltaic cell having a circular aperture therein, a second photovoltaic cell having a circular aperture therein, and a third photovoltaic cell, said objective lens having an optical axis extending in concentric relation to said circular apertures, the first and second apertured cells being positioned in said mounting means intermediate said apertured plate and said third photovoltaic cell, the circular aperture of said first photovoltaic cell having a smaller diameter than the circular aperture of said plate, and the circular aperture of said second photovoltaic cell having a smaller diameter than the circular aperture of said first photovoltaic cell, the circular apertures having successively smaller diameters so that the passage of light rays to said photovoltaic cells through said apertures may be effectively controlled by the angular relation of the optical axis of the objective lens to the incoming light rays, a calibrating resistor, the first, second and third photovoltaic cells being serially connected with the calibrating resistor in an electrical loop network, the first photovoltaic cell providing upon illumination thereof a first electrical output voltage, the second and third photovoltaic cells providing upon illumination thereof a second electrical output voltage, the photovoltaic cells being operatively arranged so that the first and second electrical output voltages act in opposition, a pair of electrical output conductors, one of said electrical output conductors leading from a point between said serially connected calibrating resistor and said second photovoltaic cell, and the other of said electrical conductors leading from a point between said first and third serially connected photovoltaic cells, and a resultant difference in said output voltages being applied through said output conductors as an electrical output signal responsive to said angular relation of the incoming light rays to the optical axis of the objective lens, and including a trigger network controlled by the electrical output signal to actuate a relay for rendering effective a light shield for the telescope upon the angular relation between the incoming light rays and the optical axis of the objective lens being less than a predetermined critical angular relation, and an ambient temperature responsive resistor connected in parallel to the calibrating resistor and variable with changes in the ambient temperature so as to vary the resultant electrical output signal in a sense to correct for changes in the trigger network due to the changes in the ambient temperature.

14. For use on an earth orbiting space vehicle carrying a tracking telescope, an electro-optical apparatus comprising a light ray angle sensing means including an objective lens having an optical axis extending in an angular relation to incoming albedo light rays from the earth, a plurality of photovoltaic cells, means for mounting the photovoltaic cells in spaced relation along the optical axis, the photovoltaic cells extending in the mounting means transverse the optical axis, at least one of the photovoltaic cells providing upon illumination thereof a first electrical output voltage, other of the photovoltaic cells providing upon illumination thereof a second electrical output voltage acting in opposition to the first electrical output voltage, the mounting means including a tubular housing, the objective lens being mounted in an open end of said tubular housing, a plate having a circular aperture positioned in said housing adjacent to said objective lens, the plurality of photovoltaic cells being mounted in said tubular housing in successive order, at least one of said photovoltaic cells having a circular aperture therein, the optical axis of the objective lens extending in concentric relation to said circular apertures, the apertured cell being positioned in said tubular housing intermediate said apertured plate and other of said photovoltaic cells, the circular aperture of said cell having a smaller diameter than the circular aperture of said plate so that passage of light rays to said photovoltaic cells through said apertures may be effectively controlled by the angular relation of the optical axis of the objective lens to the incoming light rays, and including a trigger network controlled by the electrical output signal to actuate a relay for rendering effective a light shield for the telescope upon the angular relation between the incoming light rays and the optical axis of the objective lens being less than a predetermined critical angular relation.

15. For use on an earth orbiting space vehicle carrying a tracking telescope, an electro-optical apparatus as defined by claim 14 including the photovoltaic cells being serially connected in an electrical network and so arranged that the first and second electrical output voltages act in opposition, and electrical output conductors connected across said one photovoltaic cell for applying a resultant difference in said output voltages as the electrical output signal upon the angular relation between the incoming light rays and the optical axis of the objective lens being less than the predetermined critical angular relation.

16. For use on an earth orbiting space vehicle carrying a tracking telescope, an electro-optical apparatus as defined by claim 15 and including a calibrating resistor and a temperature responsive resistor connected in parallel to the calibrating resistor in the electrical network and variable with the prevailing ambient temperature so as to vary the resultant electrical output signal in a sense to correct for changes in the trigger network resulting from the variations in the ambient temperature so as to maintain effective the predetermined critical angular below which the relay is actuated for rendering effective the light shield of the telescope.

References Cited

UNITED STATES PATENTS 3,218,909   11/1965   Fain _____________ 250—203 X

JAMES W. LAWRENCE, Primary Examiner

E. R. LA ROCHE, Assistant Examiner

U.S. Cl. X.R.

250—83.3

FO-1050
(5/39)

UNITED STATES PATENT OFFICE
CERTIFICATE OF CORRECTION

Patent No. 3,486,030          Dated December 23, 1969

Inventor(s) Alfred E. Eckermann

It is certified that error appears in the above-identified patent and that said Letters Patent are hereby corrected as shown below:

Claim 3, column 10, line 40 delete "the trigger network due to" and further delete lines 41, 42, 43, 44, 45, 46, 47, 48 and 49, inclusive, of column 10.

Claim 16, column 14, line 51 after "angular" insert -- relation -- .

SIGNED AND
SEALED
MAY 26 1970

(SEAL)
Attest:

Edward M. Fletcher, Jr.
Attesting Officer

WILLIAM E. SCHUYLER, JR.
Commissioner of Patents